United States Patent
Leppänen et al.

(10) Patent No.: US 10,928,893 B2
(45) Date of Patent: Feb. 23, 2021

(54) CONTENT DELIVERY

(71) Applicant: Nokia Technologies Oy, Espoo (FI)

(72) Inventors: Jussi Leppänen, Tampere (FI); Antti Eronen, Tampere (FI); Arto Lehtiniemi, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 201 days.

(21) Appl. No.: 15/188,402

(22) Filed: Jun. 21, 2016

(65) Prior Publication Data

US 2016/0370858 A1   Dec. 22, 2016

(30) Foreign Application Priority Data

Jun. 22, 2015   (EP) .................................. 15173208

(51) Int. Cl.
| | | |
|---|---|---|
| *G06F 3/01* | (2006.01) | |
| *G06F 3/14* | (2006.01) | |
| *G06T 19/00* | (2011.01) | |
| *G09G 5/12* | (2006.01) | |
| *H04N 21/41* | (2011.01) | |
| *H04N 21/431* | (2011.01) | |
| *H04N 21/488* | (2011.01) | |

(52) U.S. Cl.
CPC ............ *G06F 3/013* (2013.01); *G06F 3/1423* (2013.01); *G06T 19/006* (2013.01); *G09G 5/12* (2013.01); *H04N 21/4122* (2013.01); *H04N 21/4316* (2013.01); *H04N 21/4318* (2013.01); *H04N 21/4886* (2013.01); *G09G 2340/125* (2013.01); *G09G 2354/00* (2013.01)

(58) Field of Classification Search
CPC .. G02B 27/01; G02B 27/017; G02B 27/0093; G06F 3/011; G06F 3/012; G06F 3/013
See application file for complete search history.

(56) References Cited

U.S. PATENT DOCUMENTS

| | | | |
|---|---|---|---|
| 6,577,329 B1 | 6/2003 | Flickner et al. | |
| 8,619,095 B2 * | 12/2013 | Jaramillo | G09G 5/00 345/619 |
| 2003/0210285 A1 * | 11/2003 | Numano | G06F 1/1616 715/856 |

(Continued)

FOREIGN PATENT DOCUMENTS

| | | |
|---|---|---|
| EP | 2804093 A1 | 11/2014 |
| JP | H11243512 A | 9/1999 |

(Continued)

OTHER PUBLICATIONS

"Augmenting TV", Gamesalfresco, Retrieved on Oct. 6, 2016 Webpage available at : https://gamesalfresco.com/2010/08/10/augmenting-tv/.

(Continued)

*Primary Examiner* — William Boddie
*Assistant Examiner* — Jeffrey Parker
(74) *Attorney, Agent, or Firm* — Harrington & Smith

(57) ABSTRACT

A method, apparatus and computer program code are provided. The method comprises: monitoring a viewer's gaze direction towards a first display while the first display is displaying primary visual content and secondary visual content; determining that the viewer's gaze is directed towards the secondary visual content displayed by the first display; and causing the secondary visual content to be expanded by a second display, different from the first display.

24 Claims, 8 Drawing Sheets

(56) References Cited

U.S. PATENT DOCUMENTS

| | | | |
|---|---|---|---|
| 2005/0083331 A1* | 4/2005 | MacKinlay | G06F 3/1446 345/473 |
| 2012/0127284 A1* | 5/2012 | Bar-Zeev | G02B 27/017 348/53 |
| 2013/0083025 A1 | 4/2013 | Gibson et al. | |
| 2013/0187835 A1* | 7/2013 | Vaught | G06K 9/00604 345/8 |
| 2014/0198129 A1* | 7/2014 | Liu | G06F 3/04815 345/633 |
| 2015/0312558 A1* | 10/2015 | Miller | G02B 27/017 348/54 |
| 2016/0259405 A1* | 9/2016 | Wilson | G06F 3/012 |

FOREIGN PATENT DOCUMENTS

| | | |
|---|---|---|
| JP | 2008186305 A | 8/2008 |
| JP | 2009260902 A | 11/2009 |
| JP | 2011519541 A | 7/2011 |
| JP | 2018/526847 A | 9/2018 |
| WO | 2014/036362 A1 | 3/2014 |

OTHER PUBLICATIONS

"Eye Tracking", Wikipedia, Retrieved on Oct. 6, 2016 Webpage available at : https://en.wikipedia.org/wiki/Eye_tracking.

Extended European Search Report received for corresponding European Patent Application No. 15173208.8, dated Nov. 9, 2015, 8 pages.

International Search Report and Written Opinion received for corresponding Patent Cooperation Treaty Application No. PCT/FI2016/050448, dated Sep. 2, 2016, 12 pages.

Nov. 14, 2018—(JP) Office Action—App 2017-565065.

Mar. 26, 2019 (JP)—Office Action—App 2017-565065.

Feb. 8, 2019—(EP) Office Action—App 15173208.8.

* cited by examiner

CONTENT DELIVERY

TECHNOLOGICAL FIELD

Embodiments of the present invention relate to content delivery. In particular, they relate to content delivery using an augmented reality display.

BACKGROUND

Augmented reality is a form of computer-mediated reality in which a user visually experiences an environment that is partially real, and partially artificial/virtual. In augmented reality, a real scene of a physical real world environment is supplemented by one or more virtual, visual elements displayed by an apparatus to a viewer.

BRIEF SUMMARY

According to various, but not necessarily all, embodiments of the invention there is provided a method, comprising: monitoring a viewer's gaze direction towards a first display while the first display is displaying primary visual content and secondary visual content; determining that the viewer's gaze is directed towards the secondary visual content displayed by the first display; and causing the secondary visual content to be expanded by a second display, different from the first display.

According to various, but not necessarily all, embodiments of the invention there is provided an apparatus, comprising: means for monitoring a viewer's gaze direction towards a first display while the first display is displaying primary visual content and secondary visual content; means for determining that the viewer's gaze is directed towards the secondary visual content displayed by the display; and means for causing the secondary visual content to be expanded by a second display, different from the first display.

According to various, but not necessarily all, embodiments of the invention there is provided computer program code that, when performed by at least one processor, causes at least the following to be performed: monitoring a viewer's gaze direction towards a first display while the first display is displaying primary visual content and secondary visual content; determining that the viewer's gaze is directed towards the secondary visual content displayed by the first display; and causing the secondary visual content to be expanded by a second display, different from the first display.

One or more computer programs may comprise the computer program code. The one or more computer programs may be stored on one or more non-transitory computer readable mediums.

According to various, but not necessarily all, embodiments of the invention there is provided an apparatus, comprising: at least one processor; and at least one memory storing computer program code that is configured, working with the at least one processor, to cause the apparatus to perform at least: monitoring a viewer's gaze direction towards a first display while the first display is displaying primary visual content and secondary visual content; determining that the viewer's gaze is directed towards the secondary visual content displayed by the first display; and causing the secondary visual content to be expanded by a second display, different from the first display.

According to various, but not necessarily all, embodiments of the invention there is provided examples as claimed in the appended claims.

BRIEF DESCRIPTION

For a better understanding of various examples that are useful for understanding the detailed description, reference will now be made by way of example only to the accompanying drawings in which:

FIG. 1B illustrates a scene of the real space which is seen by the viewer;

FIG. 2B illustrates a scene of the augmented real space which is seen by the viewer;

DETAILED DESCRIPTION

Embodiments of the invention relate to content delivery, and, in particular content delivery using an augmented reality display.

In embodiments of the invention a viewer's gaze direction towards a first display is monitored while the first display is displaying primary visual content and secondary visual content. The primary visual content might, for instance, be a television program such as a news program and the secondary visual content could be a notification such as a news ticker item.

Embodiments of the invention determine that the secondary visual content has attracted a viewer's attention because his gaze is directed towards it. The secondary visual content is then expanded by a second display to provide the viewer with further information, potentially in motion video form. The second display may, for instance, be an augmented reality display.

A technical effect of embodiments of the invention is the provision of content (the secondary visual content) in an intelligent and efficient manner A more detailed description of embodiments of the invention follows, with reference to the figures.

Figure 1A:
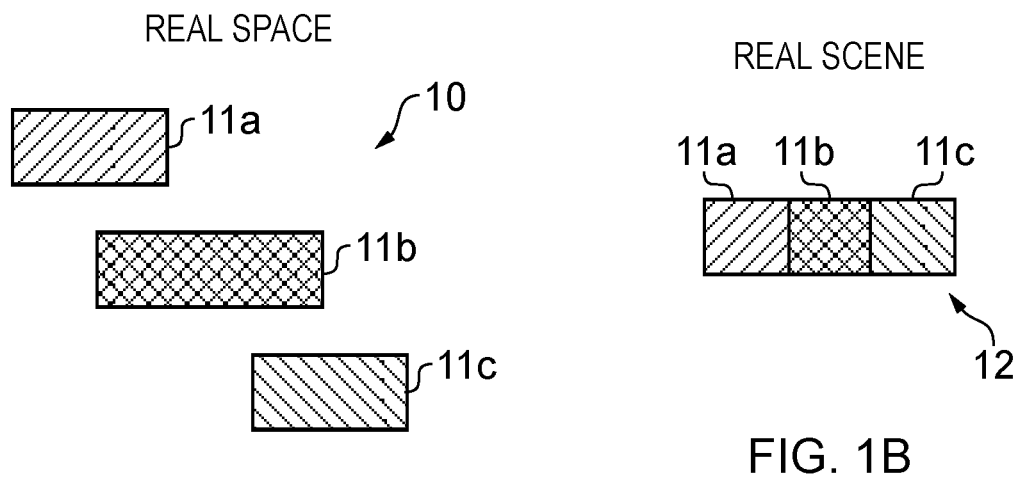
FIG. 1A illustrates a real space and a viewer of the real space.
Figure 1A:
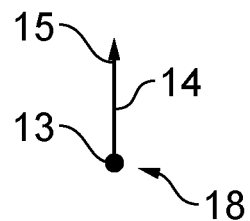

FIG. 1A illustrates a real space 10 comprising real objects 11a, 11b, 11c and a viewer 18 of the real space. The expression "real space" refers to a real, physical, three-dimensional environment.

The viewer 18 has a real point of view 14. The real point of view 14 may be changed by the viewer 18. For example, a real location 13 of the real point of view 14 is the location of the viewer 18 and can be changed by changing the physical location 13 of the viewer 18. The point of view 14 corresponds with a gaze direction 15 of the viewer 18. The gaze direction 15 can be changed by, for example, the viewer 18 changing the orientation of his head or re-directing his eyes (with or without changing the orientation of his head).

FIG. 1B illustrates a real scene 12 as viewed by the viewer 18 in FIG. 1A. The expression "real scene" refers to a real space as viewed from a particular perspective by a viewer.

Figure 2A:
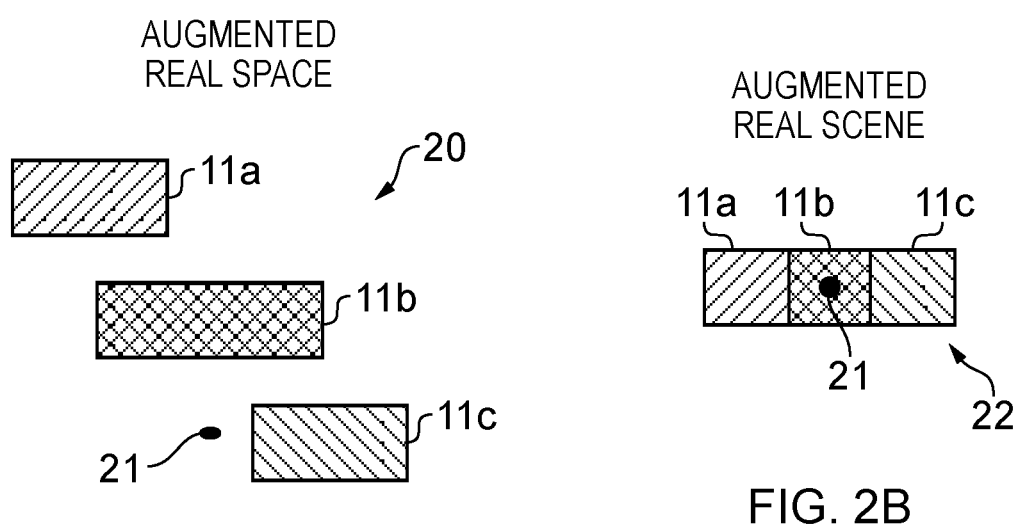
FIG. 2A illustrates an augmented real space and a viewer of the augmented real space.
Figure 2A:
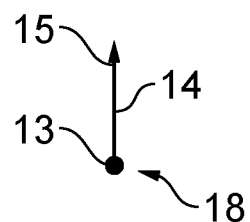

FIG. 2A illustrates an augmented real space 20 in which the real space 10, as viewed by a viewer 18, has been augmented by an augmented reality display. In this example, the augmented real space 20 includes the real objects 11a, 11b, 11c from the real space 10 and one or more supplemental, virtual, visual elements 21. The visual element(s) 21 are computer-generated elements that can be seen by the viewer 18. The visual element(s) 21 may or may not be visible to other viewers, depending upon the augmented reality display that is used to augment the real space 10. An augmented real space is a partially real, partially artificial/virtual space.

FIG. 2B illustrates an augmented real scene 22 as viewed by the viewer 18 in FIG. 2A. An "augmented real scene" is a partially real, partially artificial/virtual scene.

Figure 3:
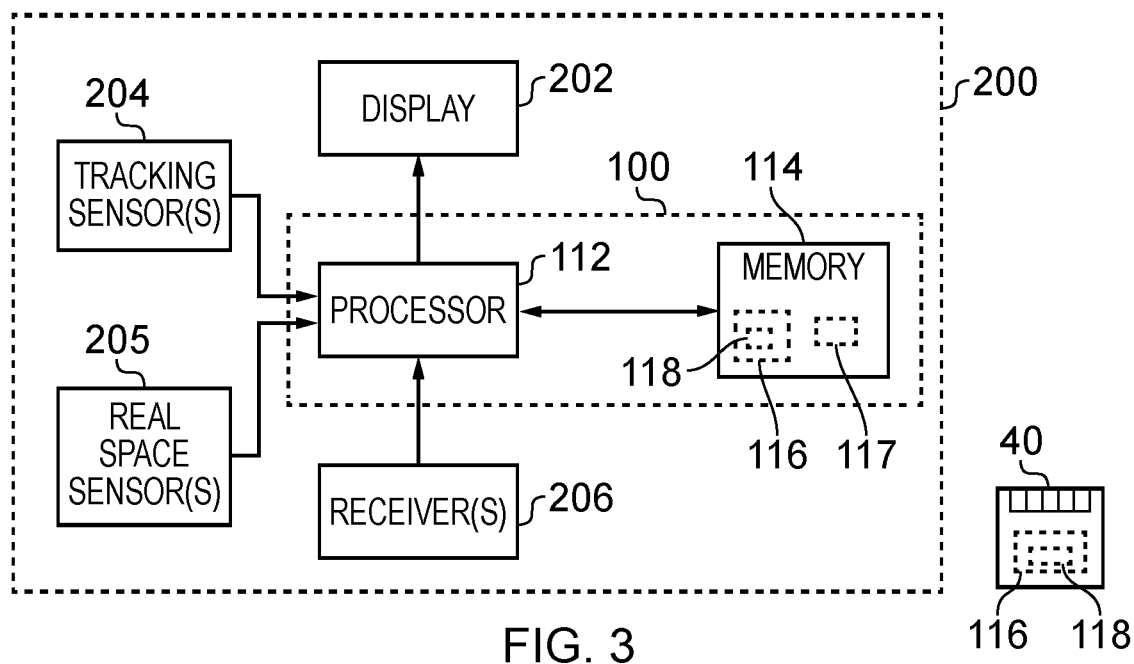
FIG. 3 illustrates a schematic of an apparatus.
Figure 4:
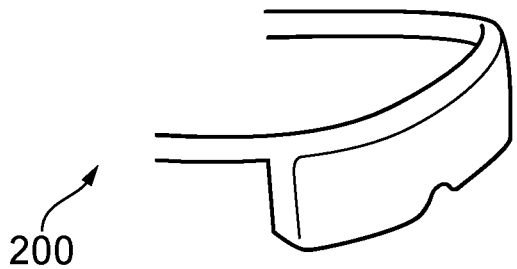
FIG. 4 illustrates a perspective view of an example of the apparatus.

FIG. 3 illustrates a schematic of an apparatus 200 in the form of an electronic augmented reality display device. The augmented reality display device 200 may, for example, be a wearable, head-mounted augmented reality display device. A perspective view of such a wearable, head-mounted augmented reality display device 200 is illustrated in FIG. 4.

In other embodiments, the apparatus 200 might not be a head-mounted display device. It might, for example, be a holographic display device which may or may not be head-mounted.

The apparatus 200 comprises a further apparatus 100 that in turn comprises at least one processor 112 and memory 114. The further apparatus 100 may, for example, be or comprise a chip or a chipset.

The processor 112 is configured to read from and write to the memory 114. The processor 112 may also comprise an output interface via which data and/or commands are output by the processor 112 and an input interface via which data and/or commands are input to the processor 112.

The memory 114 stores a computer program 116 comprising computer program code/instructions 118 that control(s) the operation of the apparatus 100/200 when loaded into the processor 112. The computer program code instructions 118 provides the logic and routines that enables the apparatus 100/200 to perform the methods illustrated in FIGS. 5 and 7. The processor 112 by reading the memory 114 is able to load and execute the computer program 116.

As illustrated in FIG. 3, the computer program 116 may arrive at the apparatus 100/200 via any suitable delivery mechanism 40. The delivery mechanism 40 may be, for example, a non-transitory computer-readable storage medium, a computer program product, a memory device, a record medium such as a compact disc read-only memory (CD-ROM) or digital versatile disc (DVD), and/or an article of manufacture that tangibly embodies the computer program 116. The delivery mechanism 40 may be a signal configured to reliably transfer the computer program 116. The signal could, for example, be sent over a wireless connection (such as a radio frequency connection) or a wired connection in accordance with one or more protocols. The apparatus 200 may propagate or transmit the computer program 116 as a computer data signal.

Although the memory 114 is illustrated as a single component/circuitry it may be implemented as one or more separate components/circuitry some or all of which may be integrated/removable and/or may provide permanent/semi-permanent/dynamic/cached storage.

Although the processor 112 is illustrated as a single component/circuitry it may be implemented as one or more separate components/circuitry some or all of which may be integrated/removable. The processor 112 may be a single core or multi-core processor. The processor 112 may, for example, include a central processing unit (CPU) and/or a graphics processing unit (GPU).

In this example, the apparatus 200 further comprises an augmented reality display 202, one or more tracking sensors 204, one or more real space sensors 205 and one or more receivers 206. Each of the elements of the apparatus 200 is operationally coupled and any number or combination of intervening elements can exist (including no intervening elements). The elements 100, 202, 204, 205, 206 of the apparatus 200 may be included in the same housing or distributed.

The processor 112 is configured to control the augmented reality display 202. The augmented reality display 202 is configured to display virtual, visual elements to supplement real world objects and augment real space/a real scene. The augmented reality display 202 may, for example, be at least partially transparent/see-through such that it enables a viewer to see real objects through the display 202. The augmented reality display 202 may, for example, include organic light emitting diode technology or liquid crystal display technology. As explained above, the augmented reality display 202 might be a holographic display.

The one or more tracking sensors 204 are configured to provide inputs to the processor 112 that enable the processor 112 to monitor a viewer's gaze. The tracking sensors 204 may be configured to track a viewer's gaze by tracking head movements of the viewer (such as a wearer of the augmented reality display device 200) and/or tracking eye movements of such a viewer.

In some examples, the one or more tracking sensors 204 may be configured to provide inputs to the processor 112 that enable the processor 112 to monitor the gaze of multiple viewers. The processor 112 may, for example, be able to use the inputs to monitor the gaze of one or more viewers of a display that is different from the augmented reality display 202.

The sensor(s) for tracking head movement may, for instance, include one or more gyroscopes, one or more magnetometers, one or more accelerometers and/or one or more cameras. The sensor(s) for tracking eye movement may include one or more cameras, for example.

The one or more real space sensors 205 are configured to provide inputs to the processor 112. The one or more real space sensors 205 may also include one or more sensors for sensing and mapping real space and real objects in the real space, such as one or more infrared sensors, ultrasonic sensors and/or one or more cameras.

The tracking and real space sensors 204, 205 may be configured to sense relative movement between real objects and the viewer (such as movement of the viewer's head, and/or movement of the viewer's eyes).

The one or more receivers 206 are configured to receive data and provide corresponding inputs to the processor 112. The one or more receivers 206 may include one or more wireless receivers and/or one or more wired receivers. Such wireless receivers may, for example, include radio frequency receivers in the form of one or more long range cellular receivers or short range wireless receivers (which, for example, may operate in accordance with an Institute of Electrical and Electronic Engineers wireless local area network 802.11 protocol or a Bluetooth protocol).

The apparatus 200 may also comprise one or more wireless transmitters and/or one or more wired transmitters. That/those transmitters may share one or more components with the one or more receivers 206 by forming part of one or more transceivers.

Figure 5:
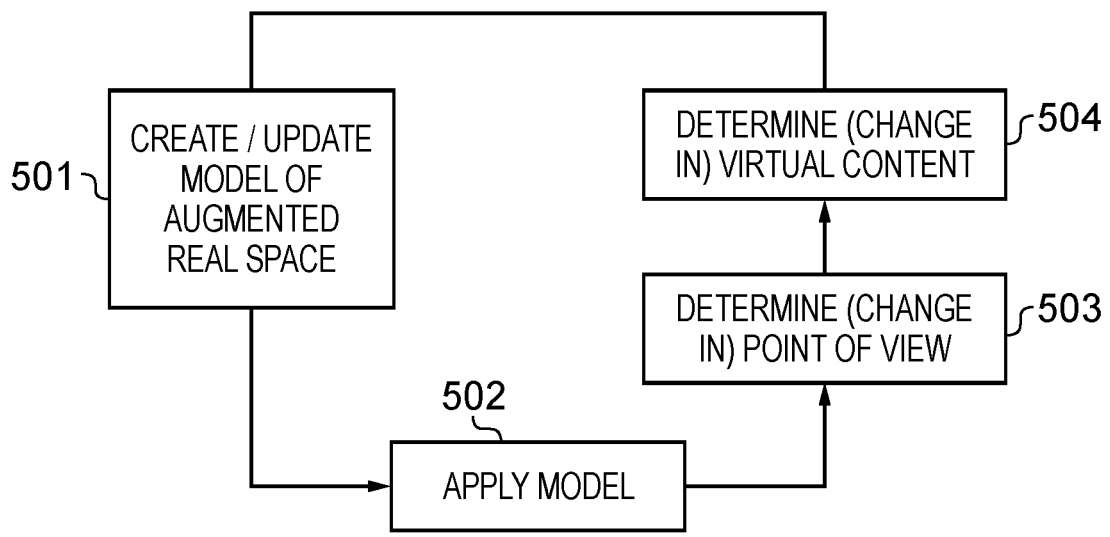
FIG. 5 illustrates a method of creating and updating a viewable, augmented real space.

FIG. 5 illustrates a method of creating and updating a viewable, augmented real space. The processor 112 stores a model 117 of in the memory 114 which is updated periodically. The model 117 may include a map of real space and real objects in the real space, along with one or more supplemental, visual virtual elements. At block 501 in FIG. 5, in this example, the processor 112 creates the model 117 based on inputs provided by the sensors 204, 205. The processor 112 then applies the model 117 in block 502 by controlling the augmented reality display 202 to display visual virtual elements. In block 503, the sensors 204, 205 determine whether there have been any changes to a viewer's point or view or the real objects being mapped in real space and provide relevant inputs to the processor 112. In block 504, the processor 112 determines whether any changes are to be made to the visual virtual elements being displayed by the augmented reality display 202 and, if so, what those changes are. The method then returns to block 501, in which the model 117 is updated based on the inputs from the sensors 204, 205 in block 503 and any changes in virtual content that were determined in block 504.

A further method according to embodiments of the invention will now be described in relation to FIGS. 6 to 11.

Figure 6:
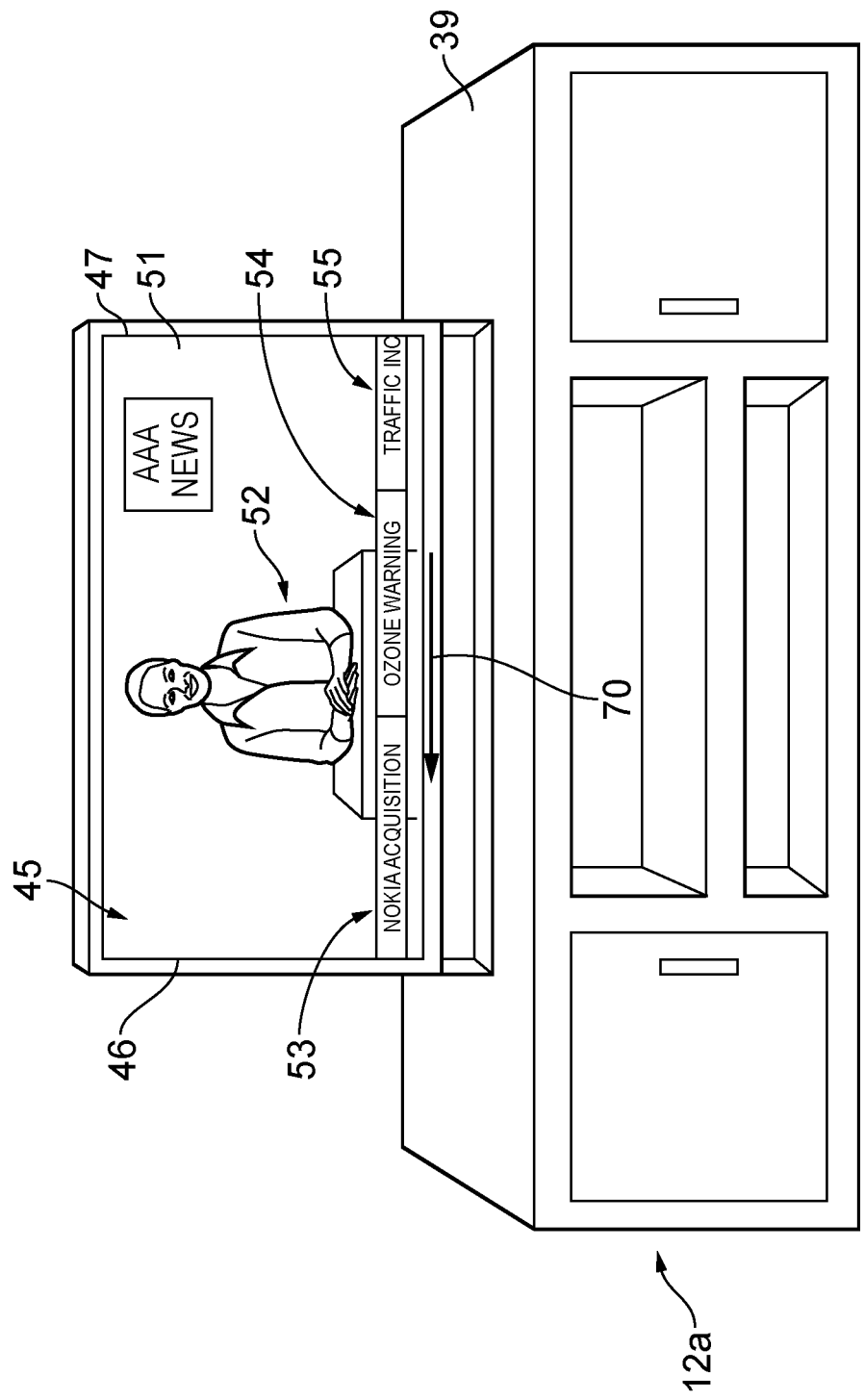
FIG. 6 illustrates an example of a real scene which is seen by a viewer of a real space, wherein a first display in the real scene is displaying primary and secondary visual content.

FIG. 6 illustrates a real scene 12a that includes a real, tangible, first display 51 (which, in this example, forms part of a device/television set 45) positioned on a cabinet 39. The television set 45 does not form part of the apparatus 200 illustrated in FIGS. 3 and 4.

In FIG. 6 the first display 51 is simultaneously displaying primary visual content 52 and secondary visual content 53, 54, 55. In the illustrated example, the primary visual content 52 is motion video content in the form of a television news broadcast. The motion video content substantially fills the first display 51.

There are multiple items of secondary visual content 53-55 in the illustrated example. In other examples, however, there might only be a single item of secondary visual content. First, second and third items of secondary visual content 53-55 are shown in the illustration. Each item of secondary visual content 53-55 is a notification in the form of the news ticker item in this example.

In this example, the secondary visual content 53-55 is smaller in size than the primary visual content 52 and overlays the secondary visual content 53-55. The secondary visual content 53-55 is in motion, moving from right to left across the first display 45, as indicated by the arrow labelled with the reference numeral 70 in FIG. 6. Each item of secondary content 53-55 enters the first display 51 at a right hand edge 47 of the first display 51, moves across the first display 51, and exits the first display 51 at a left hand edge 46 of the first display 51.

In other examples, the secondary visual content 53-55 might move in a different direction. The direction of movement might be one-dimensional, as described above and illustrated in the figures, or multi-dimensional.

The processor 112 of the apparatus 200 is able to identify the presence of the first display 51 from inputs provided to it by the real space sensor(s) 205. For instance, the processor 112 may perform image processing on inputs provided by a camera to identify the presence of the first display 51.

The processor 112 may also be configured to process inputs provided by the real space sensor(s) 205 to determine the presence of primary visual content 52 on the first display 51, and the presence and (changing) location of (each item of) the secondary visual content 53-55.

Figure 7:
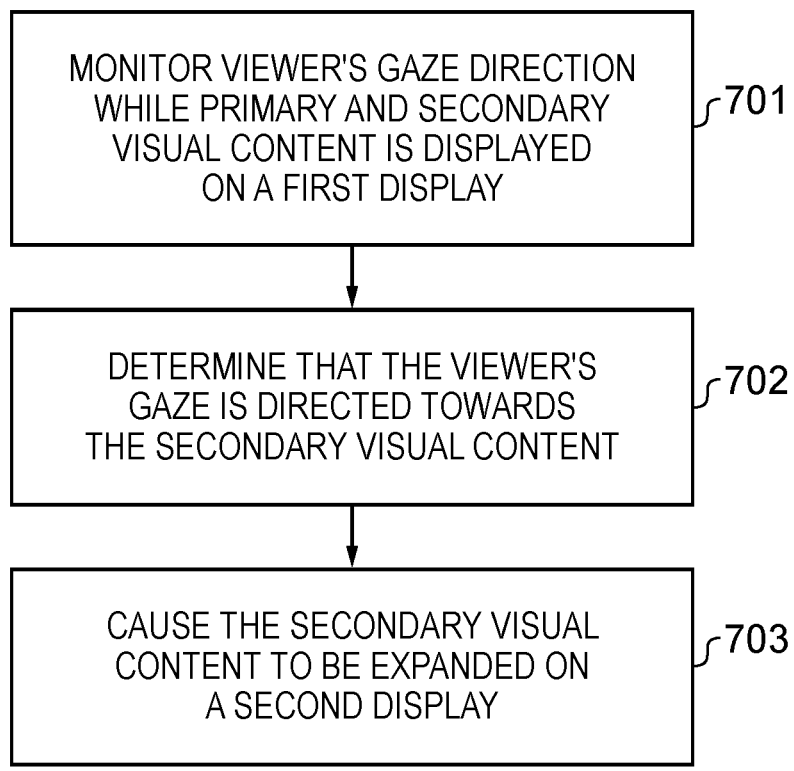
FIG. 7 illustrates a method of content delivery.
Figure 8:
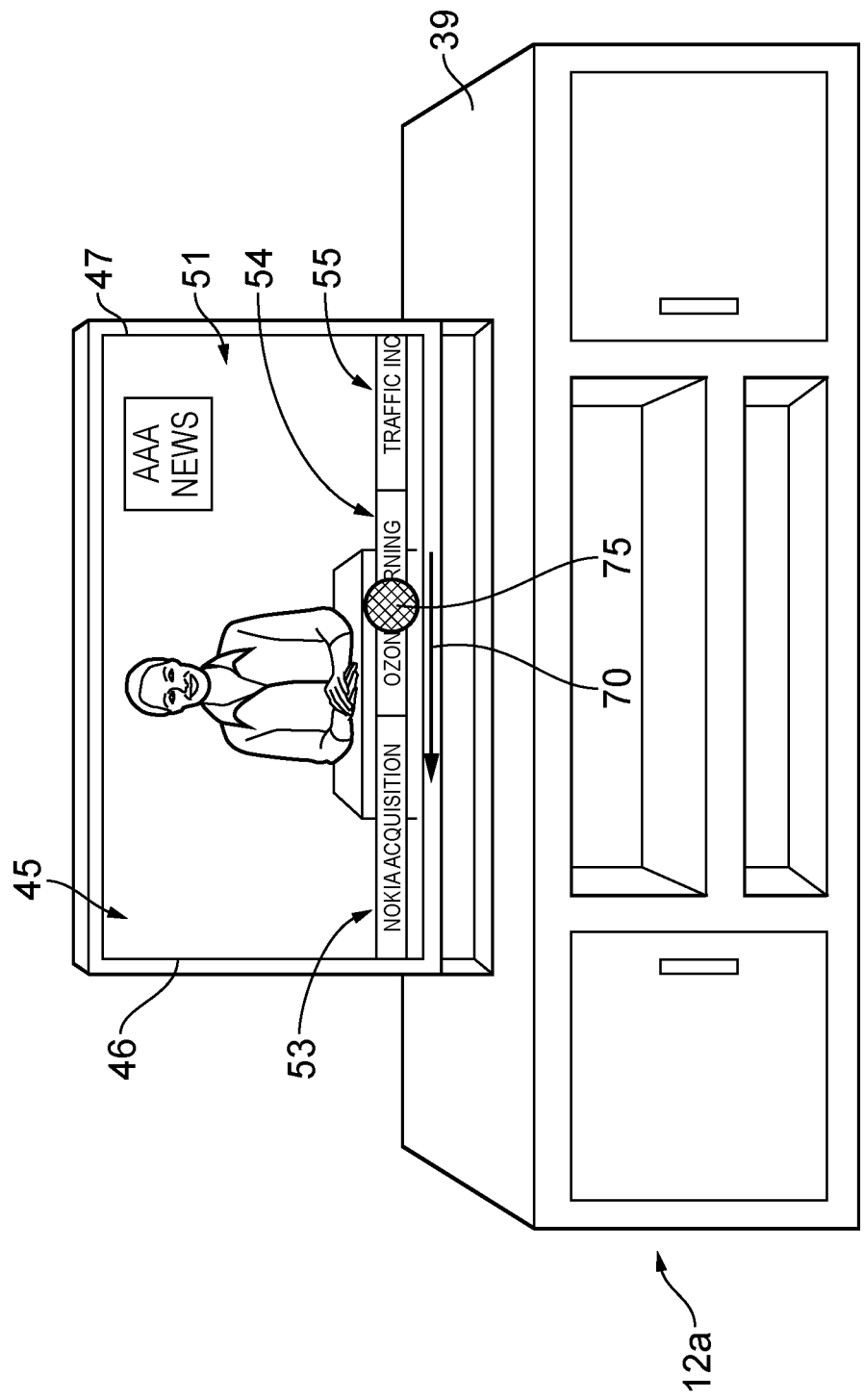
FIG. 8 illustrates the real scene of FIG. 7 in which a viewer's gaze is directed towards secondary visual content in the form of a news ticker item.

In block 701 of FIG. 7, the processor 112 of the apparatus 100/200 monitors a viewer's gaze direction towards the first display 51, while the first display 51 is displaying the primary visual content 51 and the secondary visual content 53-55. In this regard, the processor 112, the computer program code 118 and the memory 114 storing the computer program code 118 can be considered to provide means for monitoring a viewer's gaze direction towards the first display 51, while the first display 51 is displaying the primary visual content 52 and the secondary visual content 53-55.

The viewer may, for example, be a user of the apparatus 200. For instance, the viewer may be a wearer of the head-mounted device illustrated in FIG. 4. If the apparatus 200 comprises a see-through/transparent display 202, the real scene 12a may be that which is viewed through the display 202.

The processor 112 is able to monitor the viewer's gaze direction towards the first display 51 using inputs provided by the tracking sensor(s) 204 and the real space sensor(s) 205.

As explained above, the processor 112 is able to determine a direction of the viewer's gaze by processing inputs provided by the tracking sensor(s) 204. This may involve tracking head movement and/or eye movement of the viewer 18.

In block 702 of FIG. 7, the processor 112 determines that the viewer's gaze is directed towards the item of secondary visual content labelled with the reference numeral 54. In this regard, the processor 112, the computer program code 118 and the memory 114 storing the computer program code 118 can be considered to provide means for determining that a viewer's gaze is directed towards secondary visual content. The position that the viewer's gaze is directed towards is identified by cross hatching in FIG. 8.

After determining that the viewer's gaze is directed towards the second item of secondary visual content 54, in block 703 of FIG. 7 the processor 112 causes the (second item of the) secondary visual content 54 to be expanded by the augmented reality display 202 of the apparatus 200. In this regard, the processor 112, the computer program code 118 and the memory 114 storing the computer program code 118 can be considered to provide means for causing secondary visual content 54 to be expanded by the augmented reality display 202.

Figure 9:
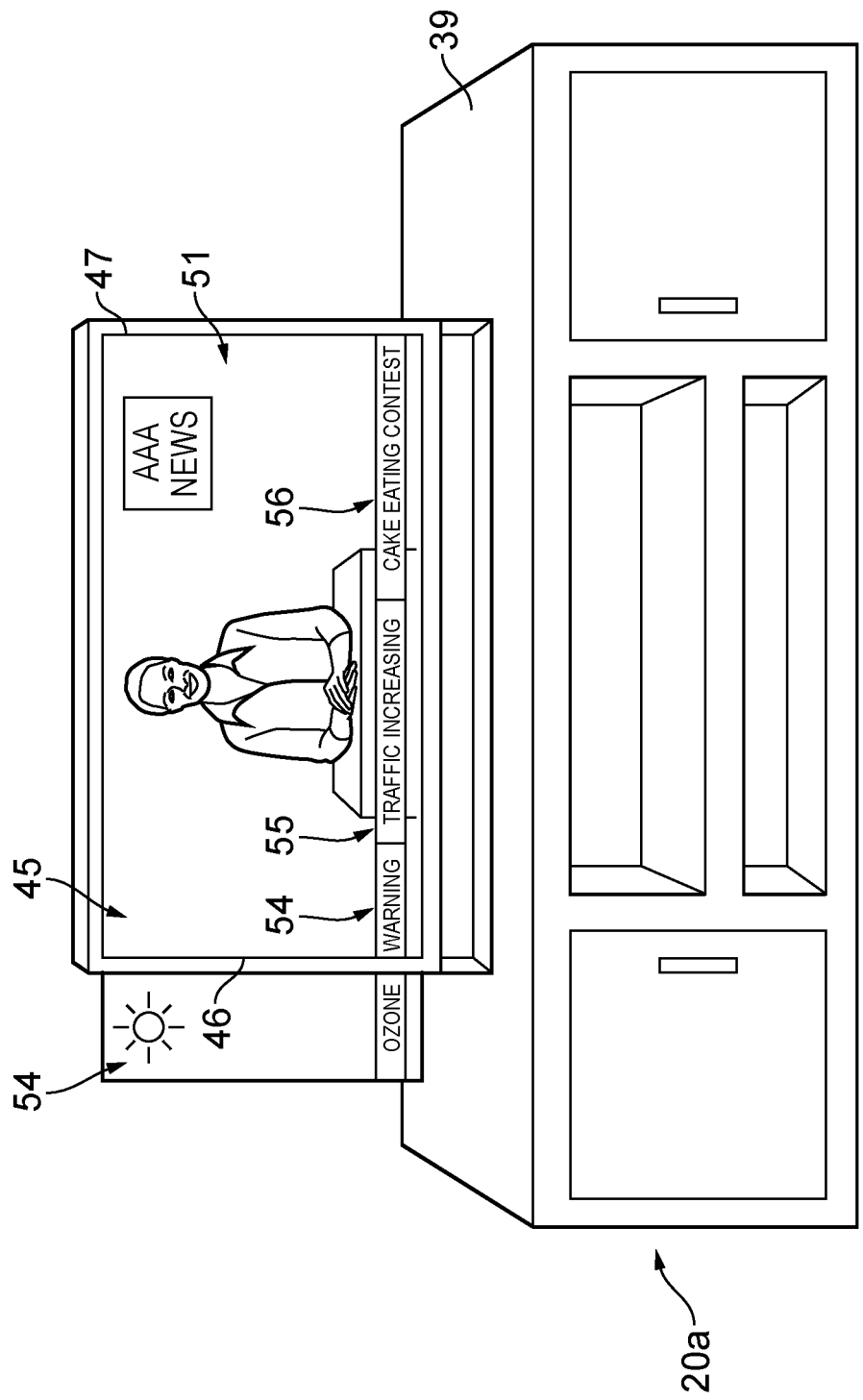
FIG. 9 illustrates an augmented real scene in which the secondary visual content is being expanded by a second display, different from the first display.

FIG. 9 illustrates the second item of secondary visual content 54 while it is in the process of being expanded from a position adjacent a periphery (in this example, the left hand edge 46) of the first display 51. FIG. 9 therefore illustrates an augmented real scene 20a.

The processor 112 may cause the second item of secondary visual content 54 to expand based in size on the determination that the viewer's gaze is directed towards the second item of secondary visual content 54 while it is in motion and based on a determination that the second item of secondary visual content 54 has reached a periphery 46 of the first display 51.

In some embodiments, the processor 112 might not cause the second item of secondary visual content 54 to expand unless it has determined that the viewer's gaze has been directed towards it for at least a threshold period of time.

The processor 112 might, for example, determine that the viewer's gaze is directed towards the second item of secondary visual content 54 before it reaches a periphery of the first display 51, but might not begin expanding the second item of secondary visual content 54 until it reaches a periphery of the first display 51. In such an example, the motion of the second item of secondary visual content 54 while it is being expanded by the augmented reality display 202 appears, to the viewer 18, to be a continuation of the motion of the second item of secondary visual content 54 prior to its expansion. Also, in effect, the expanding second item 54 appears to slide out from the periphery (the left hand edge 46) of the first display 51 as it expands in this example.

It may be that if the processor 112 determines that the viewer's gaze is not directed towards an item of secondary visual content while that item of secondary visual content is displayed by the display, it is not expanded. For instance, the illustrated example, the first item of secondary visual content 53 reaches a periphery of the first display 51 (the left hand edge 46) and exits the first display 51 without being expanded.

An item of secondary visual content that exits the first display 51 may be replaced by another item of secondary visual content. For example, when the first item of secondary visual content 53 exited the first display 51 at the left hand edge 46 of the first display 51, a fourth item of secondary visual content 56 entered the first display 51 at its right hand edge 47.

Expanded secondary visual content is an example of a visual, virtual element 21 such as that illustrated in FIGS. 2A and 2B. When the processor 112 controls the augmented reality display 202 to expand secondary visual content, as illustrated in FIG. 9, the processor 112 continuously cycles through the method illustrated in FIG. 5 to provide an up-to-date model of the augmented real space 20a.

Figure 10:
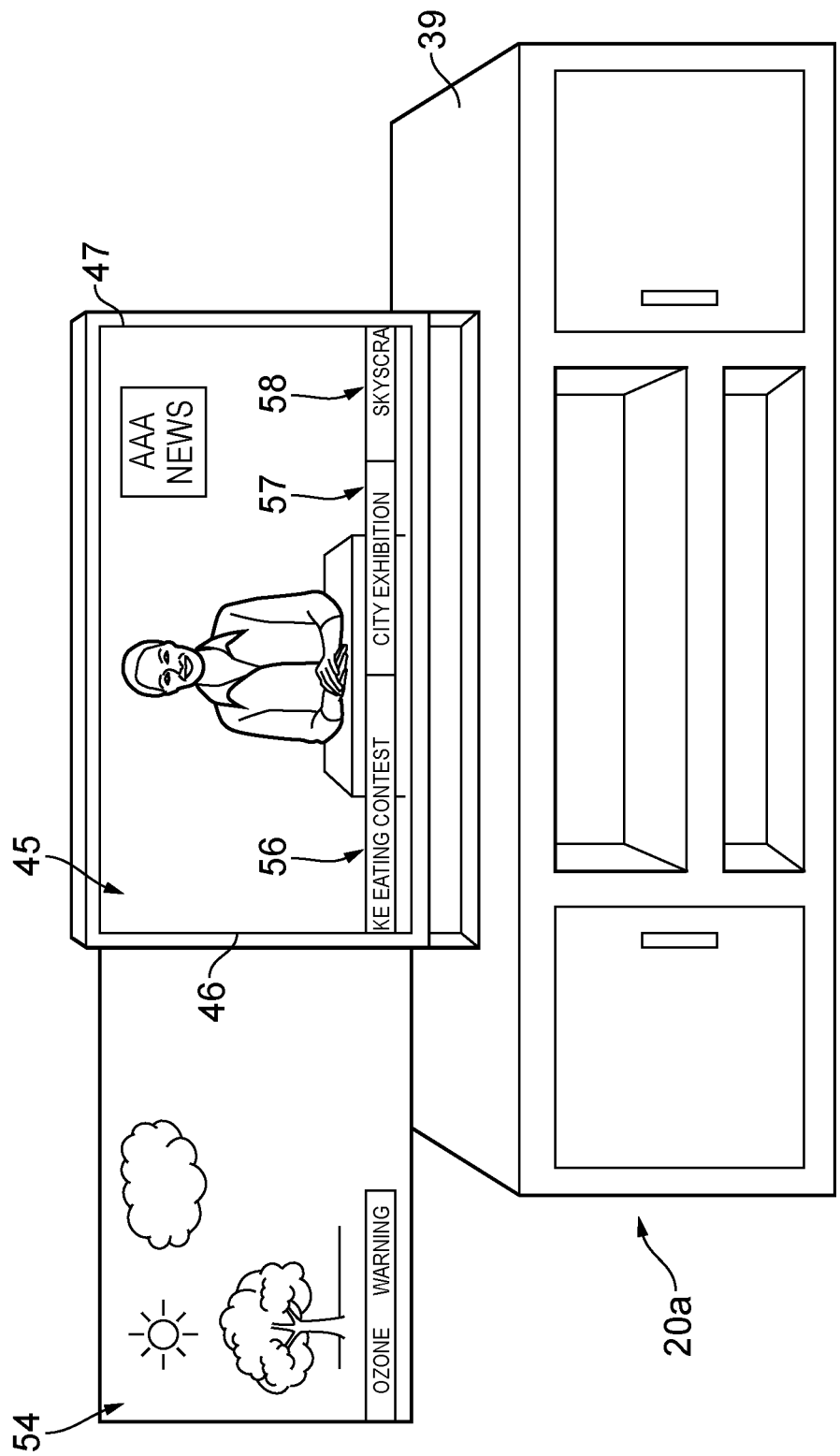
FIG. 10 illustrates the augmented real scene of FIG. 9 in which the secondary visual content has been expanded by the second display.

FIG. 10 illustrates the second item of secondary visual content 54 after it has been expanded by the augmented reality display 202 of the apparatus 200. If, for example, the apparatus 200 is a head-mounted augmented reality display device, the expanded secondary visual content 54 might only be visible to the wearer head-mounted augmented reality display device and not to other viewers of the first display 51.

The expanded secondary visual content 54 is displayed adjacent to the left hand edge 46 of the first display 51 in the illustrated example.

If, for instance, the secondary visual content 53-55 were moving downwards on the first display 51 instead of from right to left, such as from the upper edge of the first display 51 to the lower edge of the first display 51, the second item of secondary visual content 54 might instead appear to slide out from the lower edge of the first display 51 during its expansion. The expansion of the second item of secondary visual content 54 would appear, to the viewer 18, to be a continuation of the motion of the second item of secondary visual content 54 prior to its expansion and the expanded secondary visual content 54 would be displayed adjacent to the lower edge of the first display 51.

Fifth and sixth items of secondary visual content 57, 58 are shown on the first display in FIG. 10 as a consequence of the continuous motion of secondary visual content across the first display 51 while the second item of secondary visual content 54 is expanding.

The expanded second item of secondary visual content 54 may, for example, provide further information about the notification provided prior to expansion. It may, for instance, be motion video content relating to the subject identified in the notification. After the second item of secondary visual content 54 has been fully expanded, the processor 112 may cause playback of the motion video content by the augmented reality display 202 to commence.

In some embodiments, the processor 112 may cause the primary visual content 52 to be paused while the expanded second item 54 of secondary visual content is played back by the augmented reality display 202. This may be done, for example, by causing a transmitter of the apparatus 200 to transmit a (wired or wireless) signal which causes the primary visual content 52 to be paused.

Alternatively, if the processor 112 determines (for example, from inputs provided by the tracking sensor(s) 204) that a further viewer's gaze is directed towards the primary visual content 52 being displayed by the first display 51, it may cause playback of the expanded second item 54 of secondary visual content by the augmented reality display 202 to commence, but refrain from causing the primary visual content 51 to be paused.

Figure 11:
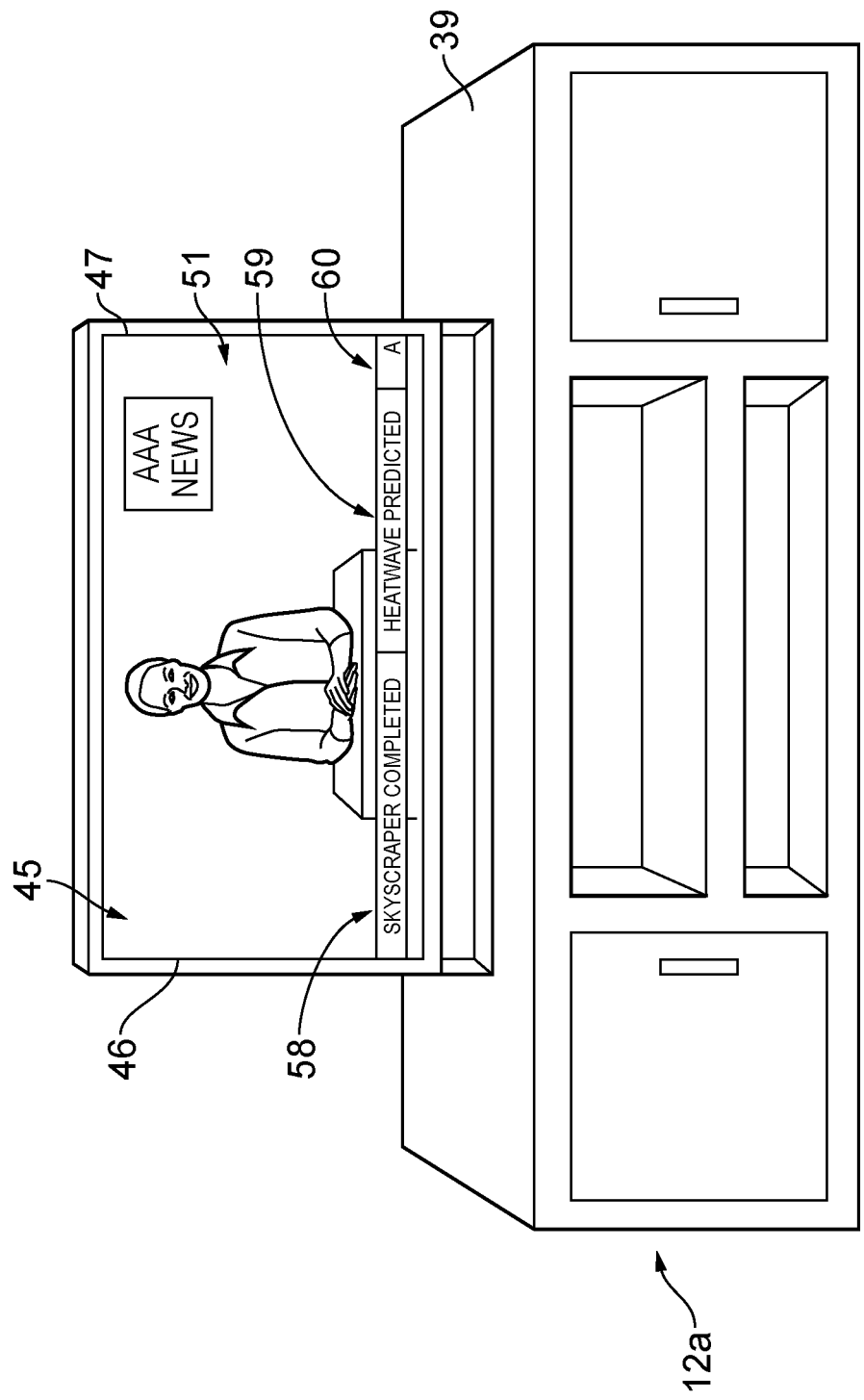
FIG. 11 illustrates the real scene after the expanded secondary visual content is no longer being displayed by the second display.

The processor 112 may continue to monitor the viewer's gaze while the expanded secondary visual content 54 is being played back. If the viewer's gaze is diverted from the expanded secondary visual content 54 (for example, for more than a threshold period of time) while it is being played back, the processor 112 may remove the expanded secondary visual content 54 from the augmented reality display 202 and, if playback of the primary visual content 52 has been paused, cause playback of the primary visual content 52 to re-commence. FIG. 11 illustrates the real scene 12a after playback of the expanded secondary visual content 54 has ceased and playback of the primary visual content 52 has recommenced. FIG. 11 illustrates sixth, seventh and eighth items of secondary visual content 58, 59, 60 being displayed by the first display 51.

Embodiments of the invention enable content to be provided to a viewer in an intelligent and efficient manner Only content which is of interest to the viewer is expanded, allowing the viewer to see the content he is most interested in.

References to 'computer-readable storage medium', 'computer program product', 'tangibly embodied computer program' etc. or a 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in FIGS. 5 and 7 may represent steps in a method and/or sections of code in the computer program 116. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed. For example, the secondary visual content need not be in motion on the first display 51; it could instead merely appear in a particular position on the first display 51 and then disappear without moving.

In the implementation described above, as the items of secondary visual content 53-60 exit the first display 51 (at the left hand edge 46), they are replaced with different items of secondary visual content 53-60 (entering at the right hand edge 47). In other implementations, this might not be the case. For example, when a particular item of secondary visual content 53-60 exits the first display 51 (for instance, at the left hand edge 46), it may then re-enter the first display 51 (for instance, at the right hand edge 47). One or more items of secondary visual content 53-60 may continually exit and re-enter the first display 51.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

We claim:

1. A method, comprising:
    monitoring, with a computing device, a direction of a viewer's gaze towards a first tangible device while a first tangible display of the first tangible device is displaying primary video content and secondary video content, wherein the secondary video content comprises one or more items and is in motion on the first tangible display, the motion of the secondary video content not being due to viewer intervention, and the secondary video content comprises a notification or a news ticker item;
    wherein the secondary video content is overlaid on the primary video content so as to render a portion of the primary video content not visible, and the secondary video content on the first tangible display is independent of the primary video content on the first tangible display;
    determining whether the viewer's gaze is directed towards one or more of the one or more items of secondary video content displayed with the first tangible display;
    in response to determining that the viewer's gaze is directed towards at least one item of the one or more items of secondary video content:
        after a portion of the at least one item of secondary video content reaches an edge of the first tangible display and no longer appears within the first tangible display, causing the portion of the at least one item of secondary video content that no longer appears within the first tangible display to be expanded and presented on an augmented reality display, different from the first tangible display, to effect a continuation of the motion of the secondary video content on the augmented reality display, wherein the expanded secondary video content comprises additional information associated with the notification or the news ticker item; and
    in response to determining that the viewer's gaze is not directed towards at least one other item of the one or more items of secondary video content, not causing any portion of the at least one other item to be expanded and presented on the augmented reality display.

2. The method of claim 1, wherein the expanded secondary video content comprises virtual, visual elements that supplement real world objects.

3. The method of claim 1, wherein the determining that the viewer's gaze is directed towards the secondary video content comprises determining that the viewer's gaze is directed towards the secondary video content for at least a threshold period of time.

4. The method of claim 1, wherein the expanded secondary video content is displayed with the augmented reality display such that the expanded secondary video content appears, to a viewer of the augmented reality display, at a position adjacent to the first tangible display.

5. The method of claim 4, wherein the secondary video content is in motion on the first tangible display towards the edge of the first tangible display prior to expansion of the secondary video content, and the expanded secondary video content is displayed adjacent the edge of the first tangible display.

6. The method of claim 1, wherein the expanded secondary video content is displayed adjacent the edge of the first tangible display after appearing, to a viewer of the augmented reality display, to slide out from the edge of the first tangible display.

7. The method of claim 1, wherein the primary video content comprises motion video content.

8. The method of claim 1, further comprising causing the primary video content to be paused and causing playback of the motion video content of the secondary visual content to commence following expansion of the secondary visual content.

9. The method of claim 1, further comprising determining that a further viewer's gaze is directed towards the primary visual content, causing playback of the motion video content of the secondary visual content to commence following expansion of the secondary visual content and refraining from causing the primary visual content to be paused.

10. An apparatus comprising at least one processor and at least one non-transitory memory, the memory comprising machine-readable instructions, that when executed cause the apparatus to:
   monitor a direction of a viewer's gaze towards a first tangible device while a first tangible display of the first tangible device is displaying primary video content and secondary video content, wherein the secondary video content comprises one or more items and is in motion on the first tangible display, the motion of the secondary video content not being due to viewer intervention, and the secondary video content comprises a notification or a news ticker item;
   wherein the secondary video content is overlaid on the primary video content so as to render a portion of the primary video content not visible, and the secondary video content on the first tangible display is independent of the primary video content on the first tangible display;
   determine whether the viewer's gaze is directed towards one or more of the one or more items of secondary video content displayed with the first tangible display;
   in response to determining that the viewer's gaze is directed towards at least one item of the one or more items of secondary video content:
      after a portion of the at least one item of secondary video content reaches an edge of the first tangible display and no longer appears within the first tangible display, expand and present the portion of the secondary video content that no longer appears within the first tangible display on an augmented reality display, different from the first tangible display, to effect a continuation of the motion of the secondary video content on the augmented reality display, wherein the expanded secondary video content comprises additional information associated with the notification or the news ticker item; and
   in response to determining that the viewer's gaze is not directed towards at least one other item of the one or more items of secondary video content, not cause any portion of the at least one other item to be expanded and presented on the augmented reality display.

11. The apparatus of claim 10, wherein the expanded secondary video content comprises virtual, visual elements that supplement real world objects.

12. The apparatus of claim 11, wherein the determining that the viewer's gaze is directed towards the secondary video content comprises determining that the viewer's gaze is directed towards the secondary video content for at least a threshold period of time.

13. The apparatus of claim 10, wherein the expanded secondary video content is displayed with the augmented reality display such that the expanded secondary video content appears, to a viewer of the augmented reality display, at a position adjacent to the first tangible display.

14. The apparatus of claim 10, wherein the secondary video content is in motion on the first tangible display towards the edge of the first tangible display prior to expansion of the secondary video content, and the expanded secondary video content is displayed adjacent the edge of the first tangible display.

15. The apparatus of claim 14, wherein the expanded secondary video content is displayed adjacent the edge of the first tangible display after appearing, to a viewer of the augmented reality display, to slide out from the edge of the first tangible display.

16. The apparatus of claim 10, wherein the primary video content comprises motion video content.

17. At least one non-transitory computer readable medium comprising instructions that, when executed with a computer, cause the computer to perform:
   monitoring a direction of a viewer's gaze towards a first tangible device while a first tangible display of the first tangible device is displaying primary video content and secondary video content, wherein the secondary video content comprises one or more items and is in motion on the first tangible display, the motion of the secondary video content not being due to viewer intervention, and the secondary video content comprises a notification or a news ticker item;
   wherein the secondary video content is overlaid on the primary video content so as to render a portion of the primary video content not visible, and the secondary video content on the first tangible display is independent of the primary video content on the first tangible display;
   determining whether the viewer's gaze is directed towards one or more of the one or more items of secondary video content displayed with the first tangible display;
   in response to determining that the viewer's gaze is directed towards at least one item of the one or more items of secondary video content:
      after a portion of the at least one item of secondary video content reaches an edge of the first tangible display and no longer appears within the first tangible display, causing the portion of the at least one item of secondary video content that no longer appears within the first tangible display to be expanded and presented on an augmented reality display, different from the first tangible display, to effect a continuation of the motion of the secondary video content on the augmented reality display, wherein the expanded secondary video content comprises additional information associated with the notification or the news ticker item; and
   in response to determining that the viewer's gaze is not directed towards at least one other item of the one or more items of secondary video content, not causing any portion of the at least one other item to be expanded and presented on the augmented reality display.

18. The non-transitory computer readable medium of claim 17, wherein the expanded secondary video content comprises virtual, visual elements that supplement real world objects.

19. The method of claim 16, wherein the computing device is a holographic display device and not a head mounted display device.

20. The method of claim 1, further comprising replacing at least one item of the one or more items of secondary video content that once appeared in motion on the first tangible display, and no longer appears within the first tangible display, to further effect a continuation of the motion of the secondary video content on the augmented reality display.

21. The method of claim 20, wherein the at least one item is replaced with itself in response to the viewer's gaze not being directed towards the at least one item, or with another at least one item of the one or more items of secondary video content in response to the viewer's gaze being directed towards the at least one item and the at least one item having been expanded on the augmented reality display.

22. The method of claim 20, wherein the at least one item was caused to be expanded and presented on the augmented reality display after reaching the edge of the first tangible display.

23. The method of claim 1, further comprising identifying the display of the first tangible device with at least one real space sensor of the computing device.

24. The method of claim 1, further comprising tracking the gaze of more than one viewer.

* * * * *